Figure 1:
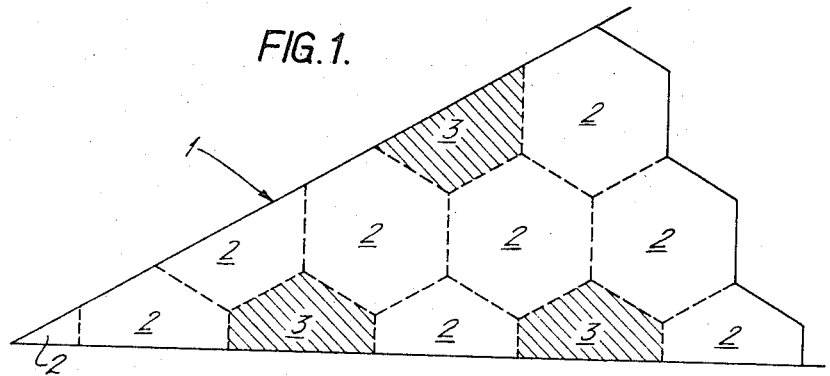

United States Patent Office 3,341,426
Patented Sept. 12, 1967

3,341,426
LIQUID MODERATOR-COOLED NUCLEAR REACTOR
Charles Peter Gratton, Dorchester, and Albert Henry Russell, Weymouth, England, assignors to Societe Anglo-Belge Vulcain S.A., Brussels, Belgium
Filed Oct. 16, 1964, Ser. No. 404,248
Claims priority, application Great Britain, Oct. 21, 1963, 41,558/63
1 Claim. (Cl. 176—41)

This invention relates to nuclear reactors having a liquid moderator which also serves as coolant.

In many reactor designs (including those utilising liquid moderator as coolant) the reactor's power output is limited by the maximum permissible temperature of the fuel bearing components, or some part of them. Thus a limiting value is set on the power output ($P_{max}$) of a fuel bearing component which sustains the maximum permissible temperature by contrast with the average power output per fuel component ($P_{av}$) throughout the core. It is a desirable design feature that the ratio $P_{max}:P_{av}$ should tend to unity, that is, the power distribution across the core should be rendered as uniform as possible. The power distribution can be considered as a direct function of the neutron flux distribution and the rendering of the flux (and hence power) more uniform is frequently termed "power flattening." Many techniques have been suggested for power flattening including the varying of the number of available fissile atoms per unit volume in different parts of the core by loading the central region of the core (where the power flux would otherwise be highest) with a fuel of lower enrichment than that utilised in the outer regions. Another technique is to utilise control rods or other absorbers such as burnable poisons inserted in those regions of the core where the flux would otherwise be highest. Yet another technique is to "replace" fuel in flux depressed localities with moderator. It is with this technique that the present invention is concerned.

According to the present invention a nuclear reactor having a liquid moderator which also serves as coolant comprises a core having a symmetrically disposed array of externally similar components, said components being spaced apart to define passages therebetween, the greater proportion of said components in said core comprising fuel-bearing components, the remaining lesser proportion of said components being fuel free and having means allowing of their flooding by the liquid moderator.

It is a feature of the invention that the liquid flow behaviour through the core is unaffected by the disposition of the fuel free components since externally such components are substantially the same as, and will influence the liquid flow in the same way as, fuel-bearing components and internally they will be flooded by moderator/coolant.

It is a further feature of the invention that a designer is left with freedom of choice as to the form he proposes to adopt for the component arrangement across the core until a late stage in the design so that modifications in core flux pattern or component arrangement are easily accommodated.

It is a further feature of the invention that no inhibitory means are used to govern the flux, for the purposes of the invention (as, for example, of those mentioned above, control rods and burnable poisons). Furthermore there is no need for the expense of fuel of different enrichments (again mentioned above).

Figure 2:
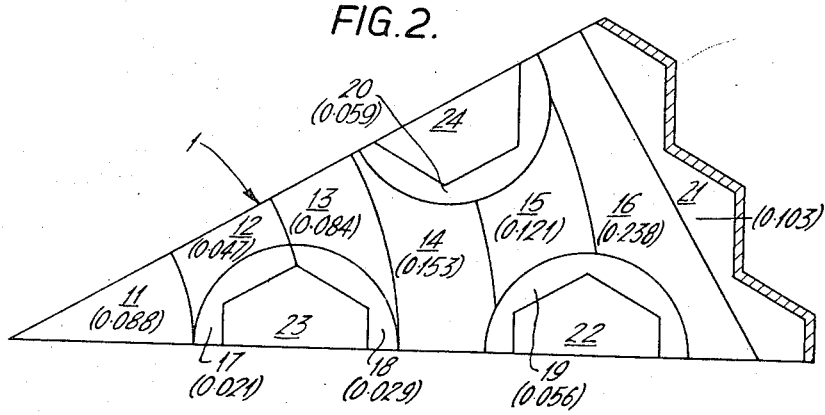
Figure 3:
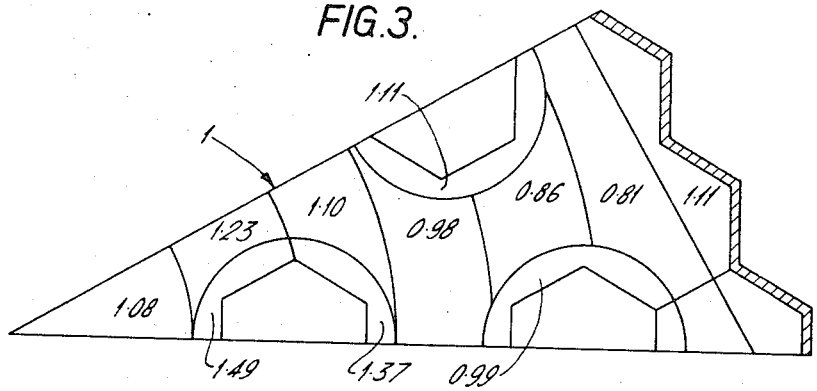
Figure 4:
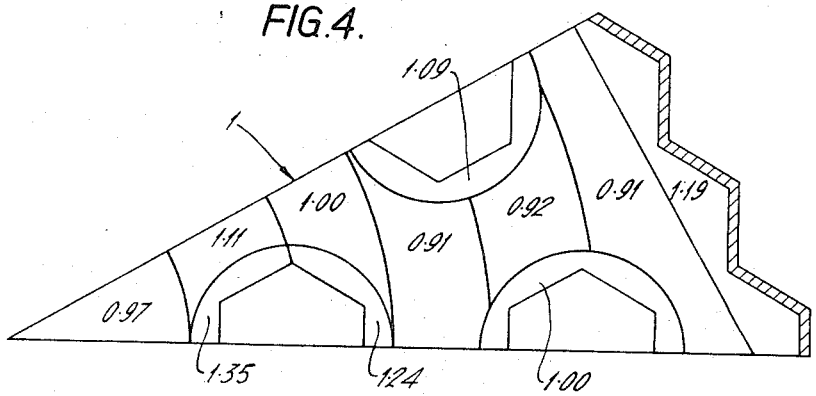

The invention will now be described, by way of example only, with reference to the accompanying diagrammatic drawings in which:

FIGURE 1 is an outlined plan of a one-twelfth portion of a reactor core, FIGURES 2–4 are computational representations of core portions similar to FIGURE 1 and FIGURES 5–10 are diagrammatic views of a number of fuel component arrangements.

Figure 5:
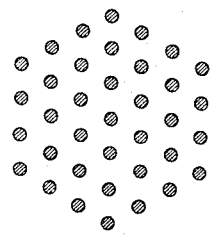
Figure 6:
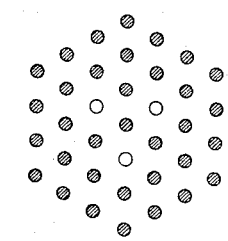
Figure 7:
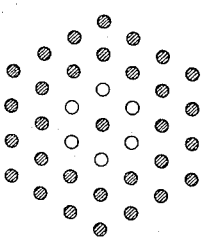
Figure 8:
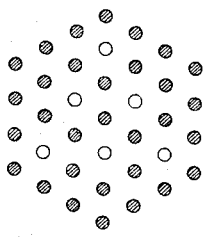
Figure 9:
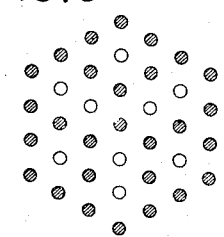
Figure 10:
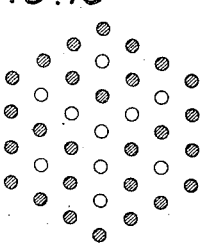

In FIGURE 1 is shown the plan of one-twelfth of a nuclear reactor core 1 made up of hexagonal prism sections, each of the prisms numbered 2 comprising a fuel element containing thirty-seven fuel-bearing components arrayed as shown for example at FIGURE 5. The prisms numbered 3 contain withdrawal rods of neutron absorber material for control purposes.

In FIGURE 2, to the same scale as FIGURE 1, are shown the regions of the core in which the power level is roughly uniform. The figures in brackets show the volume of each region as a fraction of the total core volume. Regions 11 to 21 inclusive are fuel-bearing regions. Regions 22–24 are absorber material regions (with no power operating ability) corresponding to prisms 3 in FIGURE 1.

FIGURE 3, using the boundaries of FIGURE 2, shows figures representing, for each region, the calculated average power generation per fuel-bearing component as a multiple of the average power generation per fuel-bearing component over the whole core. It is assumed that a moderator liquid having proportions 80:20::heavy water:water is used.

FIGURE 4, again using the boundaries of FIGURE 2, shows values representing, for each region, the calculated average power generation per fuel-bearing component (shown as a multiple of the average power generation per component over the whole core, of a reactor core embodying the invention). The moderator proportions are as before. The embodiment has taken the form of replacing the prism 2 having thirty-seven fuel-bearing components of FIGURE 5 by a similar form of prism containing twenty-eight fuel-bearing components, the remaining nine component spaces being filled with fuel free components such as open ended, empty fuel cans allowing of their being flooded by ambient liquid coolant/moderator. The replacement has been made in outer regions 15, 16 and 21 shown in FIGURE 2.

The following table shows the calculated effects of embodying the invention.

|  | Core of Figure 3 | Core of Figure 4 |
|---|---|---|
| Number of fuel-bearing components | 2,701 | 2,397 |
| Maximum value of average power per component | 1.49 | 1.35 |
| Minimum value of average power per component | 0.81 | 0.91 |
| Average power generation per fuel-bearing component, kw | 15.14 | 17.06 |
| Maximum power generation per fuel-bearing component, kw | 22.6 | 23.0 |
| Net power production, mw | 40.9 | 40.9 |

Thus for a smaller amount of fuel in the core of FIGURE 4 the same net power production has been achieved as in the core of FIGURE 3.

FIGURES 5–10 shows various arrangements for the relative positions of the fuel-bearing and fuel free components in a prism 2. In the figure hatched outlines represent fuel-bearing components, clear outlines represent fuel free components. Each figure contains 37 components which are made up according to the following table which shows the number of fuel-bearing components in each case:

| Prism: | Number |
|---|---|
| 5 | 37 |
| 6 | 34 |
| 7 | 31 |
| 8 | 30 |
| 9 | 28 |
| 10 | 27 |

Whilst the invention has been described above specifically in relation to reactors having a moderator of a mixture of light and heavy water, the invention is equally applicable to light water moderated or, indeed, to any other liquid moderated reactor.

We claim:

A liquid moderator-cooled nuclear reactor comprising a core having a plurality of fuel elements, each element having a symmetrically disposed array of components, said components being spaced apart to define passages therebetween for the flow of liquid moderator-coolant, the greater proportion of said components comprising fuel-containing fuel cans, the remaining, lesser, proportion of said components comprising empty fuel cans externally substantially the same as said fuel-containing fuel cans and being open-ended to permit flooding thereof with liquid moderator-coolant, said empty fuel cans being located in fuel elements only in outer regions of said core, the number of empty fuel cans being such as to provide power flattening by effectively replacing some fuel in said outer regions with moderator liquid.

References Cited

UNITED STATES PATENTS

| 3,099,616 | 7/1963 | Bauer et al. | |
| 3,146,172 | 8/1964 | Bauer | 176—42 |
| 3,147,191 | 9/1964 | Crowther | 176—73 X |
| 3,183,168 | 5/1965 | Bell | 176—42 X |
| 3,253,997 | 5/1966 | Abbott | 176—71 X |

REUBEN EPSTEIN, *Primary Examiner.*